United States Patent [19]

Oomori

[11] Patent Number: 5,278,765
[45] Date of Patent: Jan. 11, 1994

[54] APPARATUS FOR MONITORING A PREDETERMINED TREATMENT EFFECTED ON OBJECTS SUCCESSIVELY MOVED ALONG A GIVEN PATH

[75] Inventor: Hideyuki Oomori, Katsuta, Japan

[73] Assignee: Hitachi, Ltd., Tokyo, Japan

[21] Appl. No.: 550,699

[22] Filed: Jul. 10, 1990

[30] Foreign Application Priority Data

Jul. 13, 1989 [JP] Japan .................................. 1-178948

[51] Int. Cl.$^5$ ............................................. G06F 15/46
[52] U.S. Cl. .................................... 364/468; 364/184;
364/469; 364/478
[58] Field of Search ................ 364/184, 185, 468, 469,
364/478; 340/673, 674, 675, 676

[56] References Cited

U.S. PATENT DOCUMENTS

| | | | |
|---|---|---|---|
| 4,096,991 | 6/1978 | Iguchi | 235/419 |
| 4,910,675 | 3/1990 | Burns et al. | 364/478 |
| 5,105,363 | 4/1992 | Dragon et al. | 364/469 |

*Primary Examiner*—Joseph Ruggiero
*Attorney, Agent, or Firm*—Antonelli, Terry, Stout & Kraus

[57] ABSTRACT

An apparatus for monitoring whether a predetermined treatment has been effected at a predetermined working station on each of objects which are successively moved relative to the working station along a predetermined path includes an object detector for generating a first signal when each of the objects moved along the path passes a predetermined position of the working station; a timer for generating a second signal for instructing the working station to start execution of the predetermined treatment when a predetermined condition relating to execution of the predetermined treatment has been established after a lapse of a first predetermined time interval from generation of the first signal; and another timer for generating a third signal indicating failure of normal execution of the predetermined treatment when the second signal is not generated before a lapse of a second predetermined time interval from generation of the first signal, the second predetermined time interval being longer than the first predetermined time interval.

24 Claims, 5 Drawing Sheets

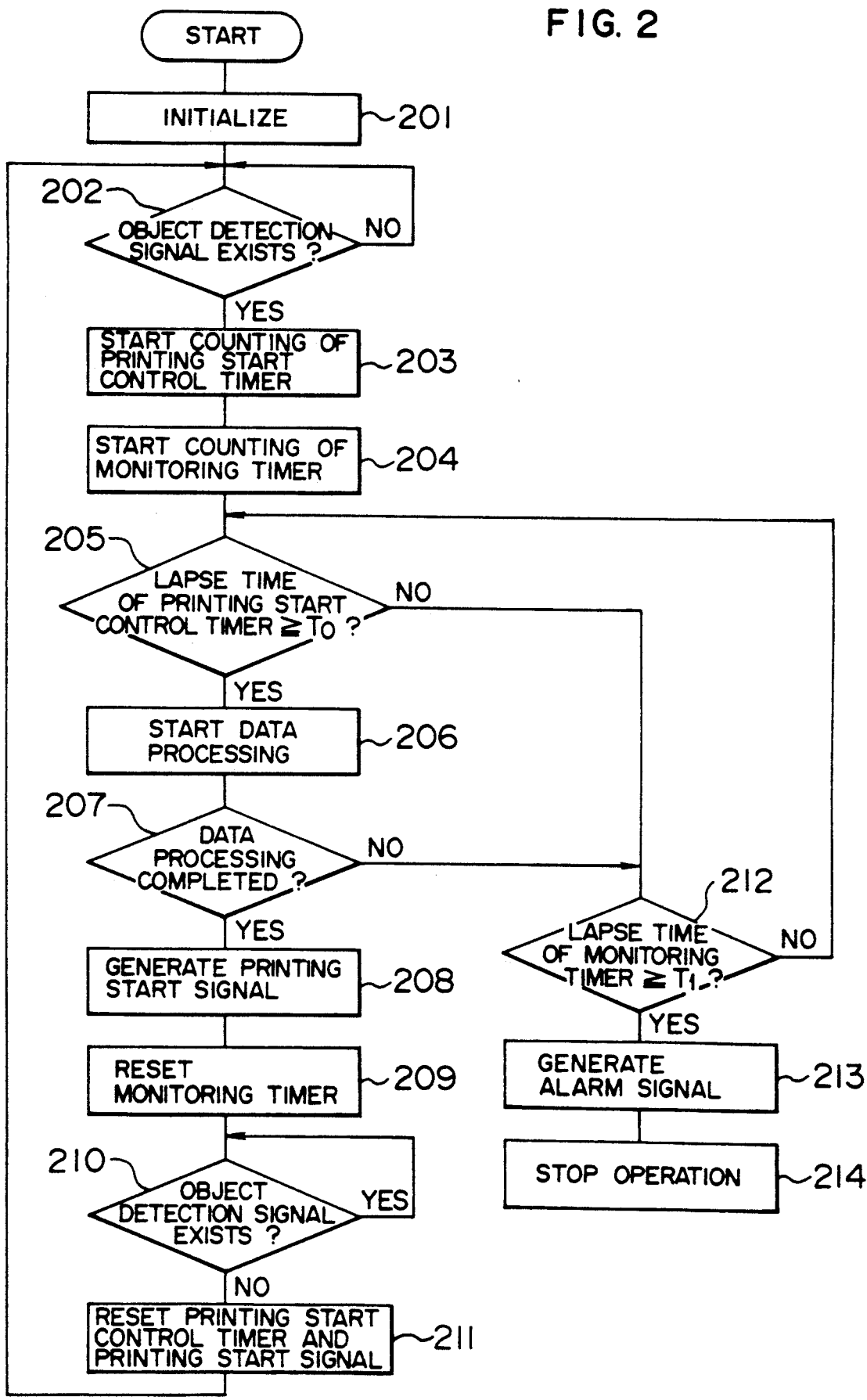

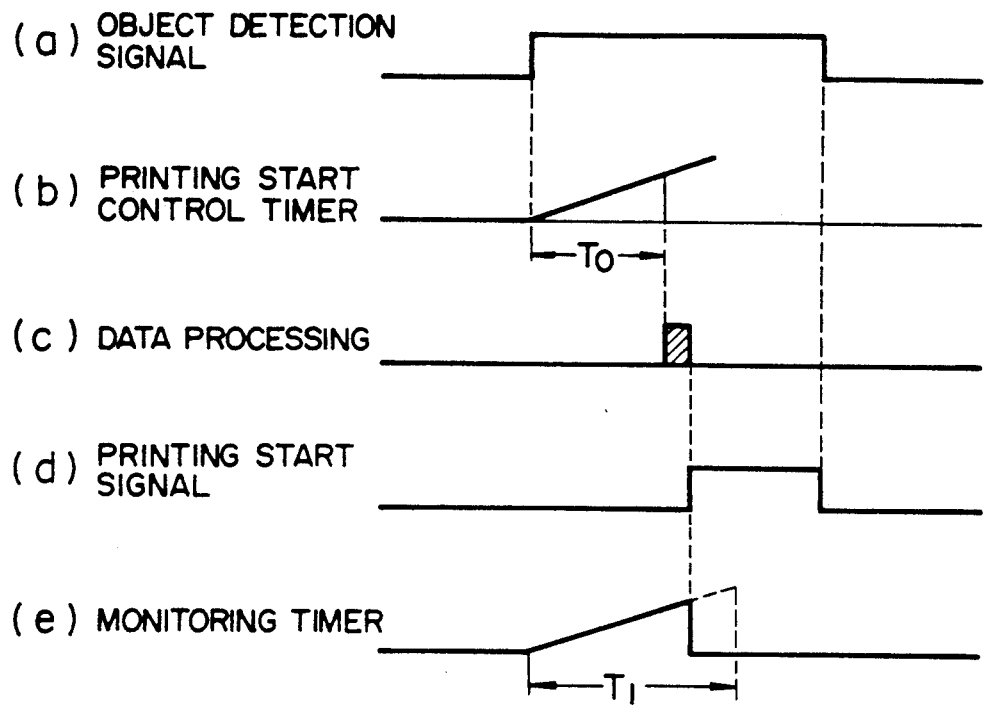
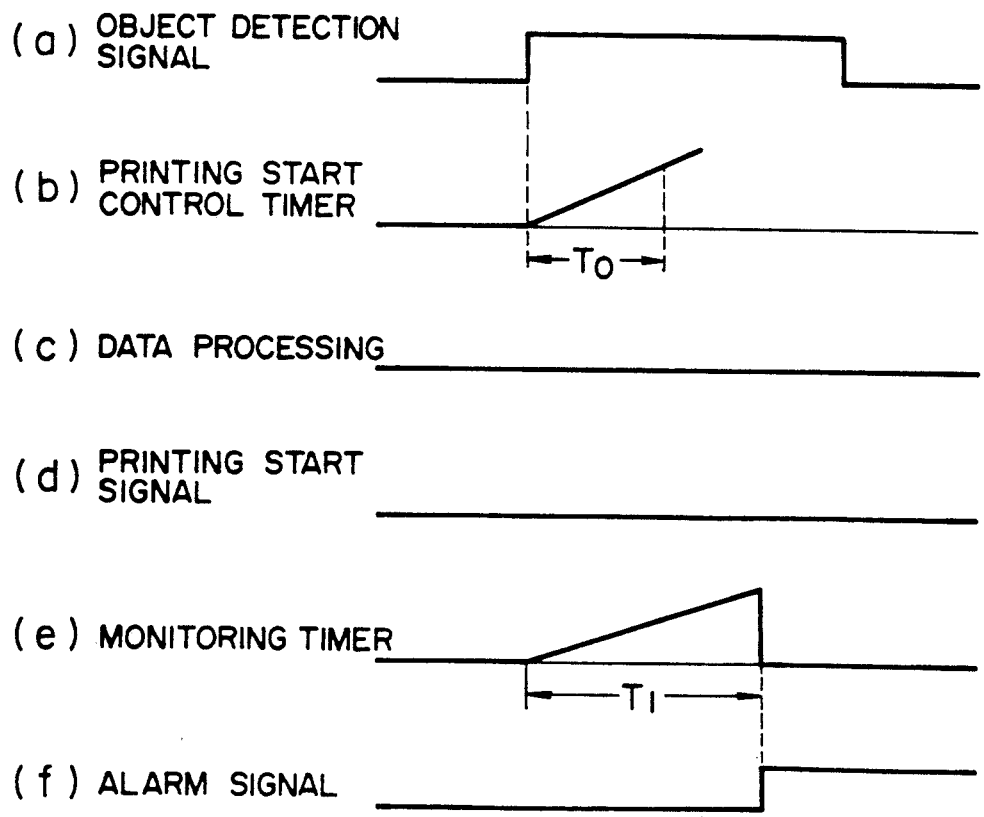

APPARATUS FOR MONITORING A PREDETERMINED TREATMENT EFFECTED ON OBJECTS SUCCESSIVELY MOVED ALONG A GIVEN PATH

BACKGROUND OF THE INVENTION

1. FIELD OF THE INVENTION

The present invention relates to an apparatus for monitoring a predetermined treatment effected on objects successively moved along a given path, and particularly relates to an apparatus for monitoring whether a predetermined treatment has been effected, at a predetermined working station, on each of objects which are successively moved to the working station along a predetermined path.

2. DESCRIPTION OF THE RELATED ART

In a system in which a predetermined treatment, such as printing of desired characters, marks, etc., laser machining or the like, is effected on objects successively transported by transporting means such as a conveyer line, generally, monitoring is made as to whether the predetermined treatment has been effected on the objects or not.

For example, there is a system in which desired items such as a product number, a production date, and so on are printed by an ink jet printer on objects successively transported by means of a conveyer line. Such a system is provided with a printer having a print head disposed opposing the conveyer line, an object sensor for producing a detection signal when the sensor detects that a leading end of each object has reached a position opposing the print head, and print control means including a microcomputer for controlling the printer so that the printer executes a predetermined printing operation in response to the detection signal.

The microcomputer of the print control means has a timer function to start counting of clock pulses in response to the detection signal of the sensor so as to produce a signal when the count value has reached a value corresponding to a predetermined time interval. Further, the microcomputer executes data processing including preparation of data to be used for controlling the print head in order to print the above-mentioned items on each of the objects in response to an output signal of the timer function, for example, data of binary codes of characters when the item is the characters, and storing the prepared data in a predetermined register. Upon completion of the data processing, the microcomputer produces a printing start signal.

Theoretically, the above-mentioned predetermined time interval must be equal to the time interval required for each of the objects to move a distance from the leading end of the object to a starting point of the printing on the object subtracted by a time interval usually required for the microcomputer to execute the data-processing. However, since the latter is negligibly small as compared with the former in normal case, there is no significant problem in practical application by setting the predetermined time interval at a value equal to the former. Accordingly, upon generation of the printing start signal, the printing start position on the object is opposing to the print head. The print control means includes means for causing the printer to start its printing operation in response to the printing start signal so that the printer prints the above-mentioned items on the object by using data stored in the register.

In the conventional printing system, however, there is a problem that the timer function of the microcomputer operates erroneously or the microcomputer fails to execute the above-mentioned data processing because the data processing may be complicated depending on the contents of the item, so that the printing start signal is not generated and printing is not started though the printing start position of the object has reached the position opposing the print head to thereby allow the object to be conveyed without being printed.

For example, as disclosed in Japanese Utility Model Publication No. JP-A-61-138054 (UM), it is known to provide a microcomputer with a watch dog timer function to detect erroneous operation of the microcomputer to thereby monitor whether the microcomputer is executing a predetermined calculation processing operation. By use of such a watch dog timer function, it is possible to detect erroneous operation of the timer function of the microcomputer. However, the watch dog timer function judges that the microcomputer is normal so long as the timer function operates normally, and it is therefore impossible to detect an event such that the microcomputer fails to execute the data processing because it is complicated. Accordingly, by means of the above-mentioned known technique, it is impossible to reliably detect the object transported without being printed.

SUMMARY OF THE INVENTION

It is therefore an object of the present invention to provide an apparatus for monitoring with a higher reliability whether a predetermined treatment has been effected at a predetermined station on each of objects which are successively moved relative to the working station along a predetermined path.

In order to achieve the above object, according to a first aspect of the present invention, the apparatus for monitoring whether a predetermined treatment has been effected at a predetermined working station on each of objects which are successively moved relative to the working station along a predetermined path, comprises: means for generating a first signal when each of the objects moved along the path passes a predetermined position of the working station; means for generating a second signal for instructing the working station to start execution of the predetermined treatment when predetermined conditions relating to execution of the predetermined treatment have been established after a lapse of a first predetermined time interval from generation of the first signal; and means for generating a third signal indicating failure of normal execution of the predetermined treatment when the second signal is not generated before a lapse of a second predetermined time interval from generation of the first signal, the second predetermined time interval being longer than the first predetermined time interval.

According to a second aspect of the present invention, the apparatus for monitoring whether a predetermined treatment has been effected at a predetermined working station on each of objects which are successively moved relative to the working station along a predetermined path, comprises: means for generating a first signal when each of the objects moved along the path passes a predetermined position of the working station; means for generating a second signal for instructing the working station to start execution of the predetermined treatment when predetermined conditions relating to execution of the predetermined treatment have been established after a lapse of a first predetermined time interval from generation of the first signal; means for generating a third signal when the second signal is not generated before a lapse of a second predetermined time interval from generation of the first signal, the second predetermined time interval being longer than the first predetermined time interval; and means for generating a fourth signal indicating failure of normal execution of the predetermined treatment when the third signal is generated with respect to each of a predetermined number of ones of the objects successively passing the predetermined position of the working station.

BRIEF DESCRIPTION OF THE DRAWINGS

FIG. 2 is a flow chart showing the operation of the microcomputer in a first embodiment of the present invention;

FIGS. 3 and 4 are diagrams respectively showing timings of generation of various signals in the cases where the apparatus is operating normally and is not operating normally in the first embodiment of the present invention;

DESCRIPTION OF THE PREFERRED EMBODIMENTS

Referring to FIGS. 1 through 4, description will be made hereunder as to an embodiment in which the present invention is applied to an ink-jet printer.

Figure 1:
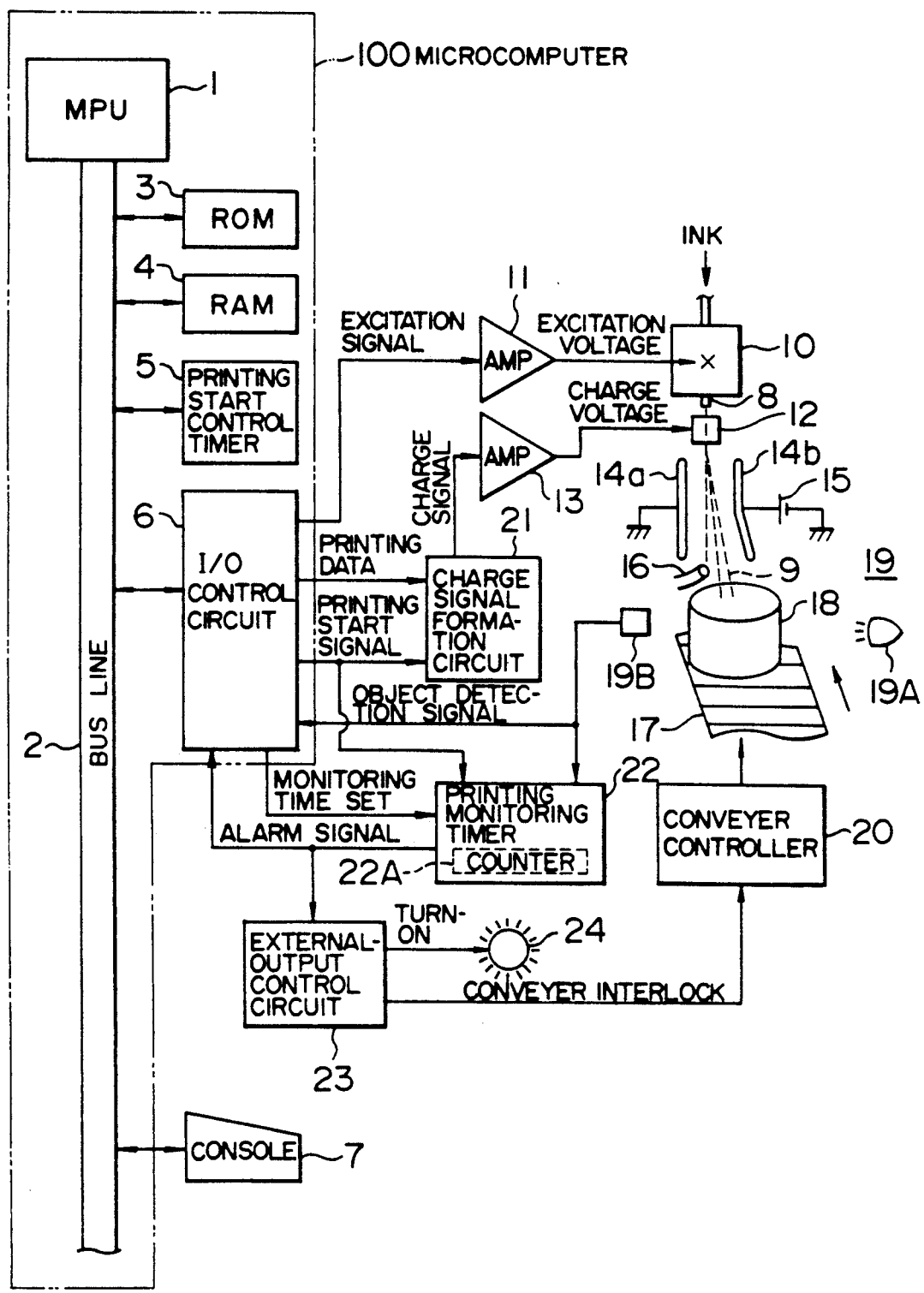
FIG. 1 is a block diagram showing the configuration in which the present invention is applied to a printing apparatus.

FIG. 1 is a block diagram showing a printing apparatus of an ink-jet printer type in which a microcomputer 100 is provided as a main control circuit element.

The microcomputer 100 includes a microprocessing unit (hereinafter referred to as "MPU") 1 for controlling apparatus, a read only memory (hereinafter referred to as "ROM") 3, a random access memory (hereinafter referred to as "RAM") 4, a printing start control timer 5, and an input/output control circuit 6. The ROM 3, the RAM 4, the timer 5, and the input/output control circuit 6 are connected to the MPU 1 through a bus 2. Necessary data are supplied to the microcomputer 100 through a console 7.

The MPU 1 executes operation processing in accordance with a program stored in the ROM 3 so as to set the printing contents and printing-position data supplied from the console 7 in the RAM 4 and the printing start timer 5, and executes control of printing carried out by the ink-jet printer on the basis of an object detection signal which will be described hereunder. The console 7 is provided with a keyboard for entry of the printing contents, the printing-position data, etc., and a display unit for confirmation of the entry through the keyboard.

A printing head of the ink-jet printer is provided with a nozzle 8 into which ink is supplied under pressure so that ink particles 9 are jetted out of an end of the nozzle 8. The nozzle 8 is connected to an electromechanical transducer element 10 such as an electrostrictive element so as to jet the ink particles 9 at a predetermined timing. The electromechanical transducer element 10 is energized with an excitation voltage supplied from a driving amplifier 11 so as to drive the nozzle 8. A charged electrode 12 is provided so as to surround a region in which the ink particles 9 are introduced from the nozzle 8. A charge voltage is supplied to the charged electrode 12 through a charge amplifier 13. The charged electrode 12 induces, in the ink particles 9, electric charges of a quantity corresponding to the degree of the charge voltage. A pair of deflecting electrodes 14a and 14b are provided at both sides of a flying path of the ink particles 9 jetted from the nozzle 8. The deflecting electrodes 14a and 14b are connected to the ground and to a deflecting power source 15, respectively, so as to generate a deflecting electric field in the ink-particle flying path. When the charged ink particles 9 are flying in the deflecting electric field, the flying direction of the charged ink particles 9 is deflected in accordance with the quantity of the electric charges carried by the ink particles 9. A gutter 16 gathers the ink particles 9 not used for recording, which fly straight without being deflected.

The printing head having such a configuration as described above is located at a position opposing a conveyer line 17 so as to project the ink particles 9 on an object 18 conveyed by the conveyer line 17. The direction of deflection of the ink particles 9 is made perpendicular to the direction in which the object 18 is conveyed so that characters are printed on the surface of the object in the form of dot matrices of the ink particles determined by the deflection of the ink particles 9 and the movement of the object 18. Such a configuration of the ink-jet printer is known.

An object sensor 19 is provided on the object conveying path and includes a light source 19A and a photosensitive element 19B provided so as to receive a light beam emitted from the light source. When the object traveling on the conveying path passes a position between the light source 19A and the photosensitive element 19B to thereby prevent the light beam of the light source 19A from reaching the photosensitive element 19B, an object detection signal is generated by the photosensitive element 19B. The position of the sensor 19 is selected so that the object detection signal is generated when a leading end of the object traveling on the conveying path has reached a predetermined position relative to the printing head.

Further, a conveyer controller 20 controls start and stop of the conveyer line 17.

During operation of the printing apparatus, the input/output control circuit 6 supplies an excitation signal to the driving amplifier 11 thereby to supply an excitation voltage to the printing head. When the object sensor 19 generates the object detection signal, the input/output control circuit 6 transfers the object detection signal to the MPU 1. Upon receiving the object detection signal, the MPU 1 actuates the printing/start control timer 5 to start counting of clock pulses. When the count reaches a predetermined number, that is, when a delay time set in the timer 5 has passed, the MPU 1 starts data processing including formation of data necessary for printing and storage of the necessary data into the RAM 4. Upon completion of the data processing, the MPU 1 generates a printing start signal. In the case where items such as a product number, a production date, etc., are to be printed, the data processing includes formation of binary-coded data representing characters included in the items on the basis of information entered through the console 7 and storage of the binary-coded data in the RAM 4. If the hardware provides a charge signal formation circuit as mentioned hereafter with a buffer, the binary-coded data may be stored in the buffer. Upon completion of the data processing, the MPU 1 generates the printing start signal.

In the case where the sensor 19 is positioned so that it generates the object detection signal when the leading end of the object has reached a position opposing the printing head, the delay time set in the timer 5 has to be selected so that the time interval required for the object to move a distance corresponding to the space between the leading end of the object and the leading end of the printing position of the items is theoretically equal to the sum of the delay time set in the timer 5 and the time interval generally required for the microcomputer to execute the data processing. Usually, however, the time interval required for the microcomputer to execute the data processing is much smaller than the delay time set in the timer, and no significant problem is caused in practical application even if the time interval required for the microcomputer to execute the data processing is disregarded. Accordingly, upon generation of the printing start signal, the printing start position on the object is opposing to the print head. The input/output control circuit 6 transfers the printing start signal to a charge signal formation circuit 21, which in turn generates a charge signal for performing printing. The MPU 1 previously supplies the charge signal formation circuit 21 with the printing data stored in the RAM 4 by the foregoing data processing. When the printing start signal is generated, the charge signal formation circuit 21 generates the charge signal for deflecting the ink particles 9 so as to form dot matrices, that is, to perform printing in accordance with the printing data.

A printing monitoring timer 22 is arranged to produce an output signal when a predetermined number of clock pulses have been counted, that is, a predetermined delay time set in the printing monitoring timer 22 has lapsed. The delay time, that is, the monitoring time, set in the printing monitoring timer 22 is selected to be longer than the sum of the delay time set in the printing-start control timer 5 and the time interval generally required for the microcomputer to execute the data processing, and shorter than a time interval required for each of the conveyed objects to pass through the position opposing the printing head, that is, the time during which the object detection signal continues. Correspondingly to the time interval until the generation of the printing start signal after the delay time of the printing-start control timer 5 has passed, the printing position on the object is displaced from a desired printing position. Accordingly, it is desirable to set the delay time of the monitoring timer at a value corresponding to an allowable maximum displacement of the printing position so that it is judged that printing is not normally carried out when the printing start signal is not generated before the delay time has passed.

The monitor time or delay time of the monitoring timer may be determined preliminarily in accordance with the kind of the objects, the object conveying speed, the printing position, the allowable maximum displacement of the printing position, the contents of printing, etc., and inputted by an operator through the console 7, or may be automatically calculated by the MPU 1 and set in the timer through the input/output control circuit 6 when the above-mentioned data are inputted by an operator through console 7. Particularly in the case where the conveying speed changes, it is desirable that a speedometer is provided on the conveying device so that the MPU 1 calculates the delay time in accordance with the detected conveying speed so as to automatically vary the delay time in accordance with the conveying speed.

Alternatively, the delay time may be determined by counting an encoder pulse produced at a frequency proportional to the conveying speed so that the delay timer is automatically changed according to variation of the conveying speed. The printing monitoring timer 22 starts to count clock pulses in response to the leading end of the object detection signal and stops the counting upon generation of the printing start signal. The printing monitoring timer 22 generates an output signal when the printing monitoring timer 22 has counted the clock pulses of the number corresponding to the delay time set in the monitoring timer before generation of the printing start signal. This output signal indicates that the printing treatment is not normally performed, and this output signal is used as an alarm signal. The input/output control circuit 6 transfers this alarm signal to the MPU 1 so that the MPU 1 performs predetermined protection control processing such as stopping the drive of the printing apparatus.

An external-output control circuit 23 turns on an alarm lamp 24 in response to the alarm signals and supplies a conveyer interlock signal to the conveyer controller 20 so that the conveyer controller 20 stops the conveyer line 17.

In this embodiment, the printing monitoring timer 22 is provided as a hardware device independent of the microcomputer 100. Although this arrangement is preferable to detect a failure in printing treatment due to any erroneous operation of the computer, the printing monitoring timer 20 may be provided as software such as a timer function of a microcomputer. As described above, a failure in printing processing is generally caused by defective operation of a timer function of a microcomputer and a failure in data processing necessary for printing. Since the probability of occurrence of defective operation of a timer function is extremely less than that of occurrence of a failure in data processing, most of the failures in printing treatment can be detected even if the monitoring timer is provided by use of a timer function of a microcomputer.

The foregoing monitoring operation is mainly controlled by the microcomputer on the basis of the program stored in the ROM. Referring to FIGS. 2, 3, and 4, the operation will be described hereunder.

As shown in a flowchart of FIG. 2, immediately after the apparatus starts to operate, initialization is executed in a step 201 in a manner such that all the timers are reset, the respective delay times of the printing-start control timer and the monitoring timer are set to the values T0 and T1 obtained through calculation on the basis of the data which has been previously entered by an operator through the console, and so on. Next, the operation goes to a step 202 in which the generation of an object detection signal shown in FIG. 3(a) is waited for. Upon generation of the object detection signal, the printing-start control timer 5 and the monitoring timer 22 start to count clock pulses in response to the object detection signal in steps 203 and 204. Accordingly, as shown in FIGS. 3(b) and 3(e), the count of each of the printing-start control timer 5 and the monitoring timer 22 gradually increases. When the count of the printing-start control timer 5 has reached a value corresponding to the set delay time T0 in a step 205, the MPU 1 executes in a step 206, at the timing as shown by dotted-line hatching in FIG. 3(c), the data processing including formation of printing data in which items, such as characters, etc., to be printed on objects are represented by a suitable form for controlling the printing head on the basis of the previously entered data and storage of the thus formed printing data into the RAM, and then a report informing of completion of the data processing is waited for in a step 207. In the case where the MPU 1 operates normally, the data processing is completed in a short time, and upon completion of the data processing, the operation goes to a step 208 in which the printing start signal is generated as shown in FIG. 3(d). In response to the printing start signal, the printing data stored in the RAM is successively supplied to the charge signal formation circuit 21 through the input-/output control circuit 6 so as to control the jet of the ink particles in a manner as described above.

Upon generation of the printing start signal, the monitoring timer is reset before the set delay time T1 thereof has passed as shown in FIG. 3(e) in a step 209. Succeedingly, the timing of termination of the object detection signal is waited for in a step 210, the printing-start control timer and the printing-start signal are reset in a step 211, and the operation returns to the step 202.

The operation has been described above as to the case where the processing is normally executed. When the printing-start control timer does not execute its timer function normally so that the count value thereof does not reach a value corresponding to the delay time T0 set in the printing-start control timer, the operation goes to a step 212 and when the count value of the monitoring timer 22 has reached a value corresponding to the delay time T1 set in the monitoring timer, the monitoring timer 22 generates the alarm signal in a step 213 so that the driving of the printing apparatus is stopped in a step 214.

Further, the operation goes from the step 207 to the step 212 also in the case where the data processing is not normally performed due to erroneous operation of the MPU 1, or the like, as shown in FIG. 4(c), that is, in the case where the data processing is not completed in the step 207. If the data processing is not duly terminated so that the printing-start signal is not generated and the monitoring timer 22 is not reset, the monitoring timer 22 continues counting as shown in FIG. 4(e). When the count of the monitoring timer 22 has reached a value corresponding to the delay time T1 set in the monitoring timer 22, the operation goes to the step 213 so that the alarm signal is generated as shown in FIG. 4(f).

In the first embodiment described above, it is monitored whether or not printing is effected on each of the objects and an alarm signal is generated immediately upon detection of a failure in printing on any one of the objects.

Figure 5:
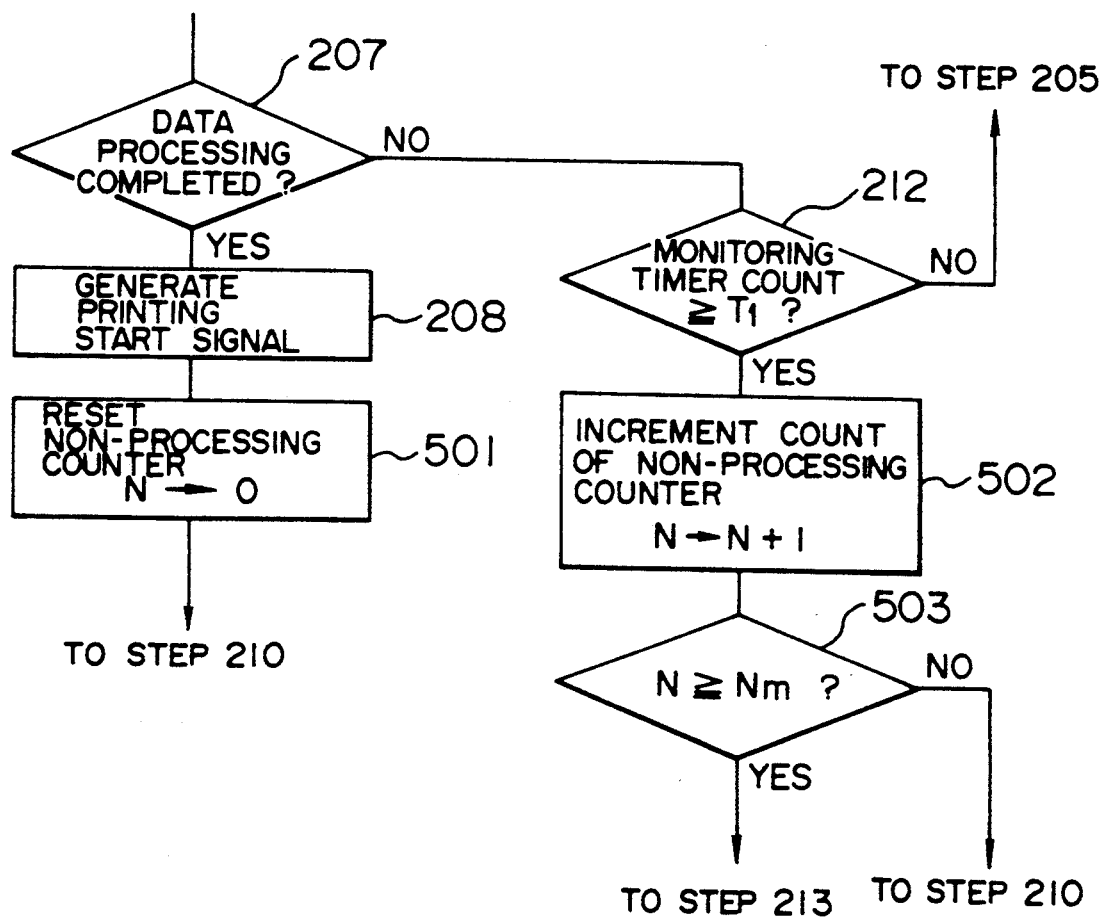
FIG. 5 is a flow chart showing the operation of the microcomputer in a second embodiment of the present invention.
Figure 6:
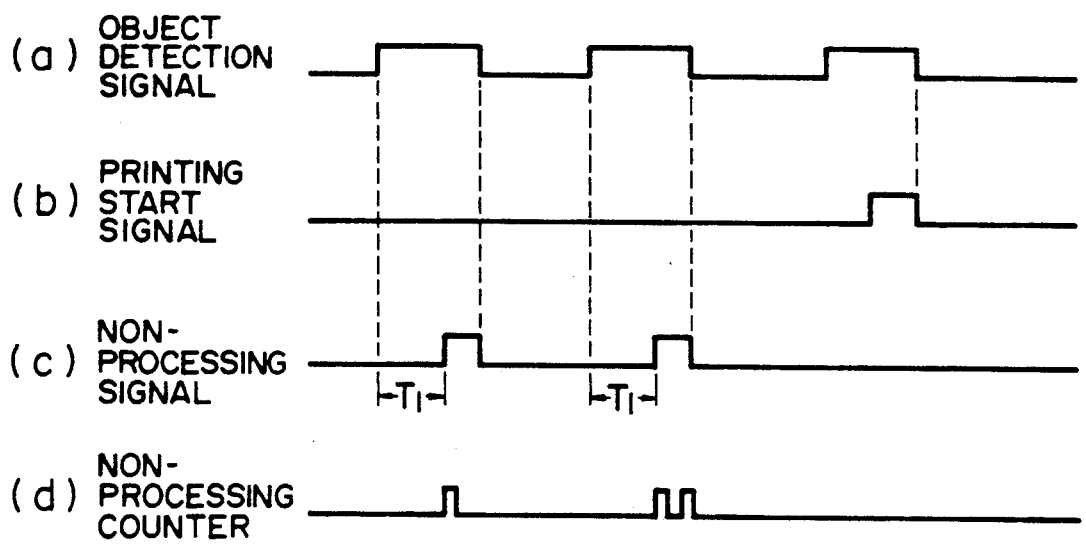
FIGS. 6 and 7 are diagrams respectively showing timings of generation of various signals in the cases where the apparatus is operating normally and is not operating normally in the second embodiment of the present invention.
Figure 7:
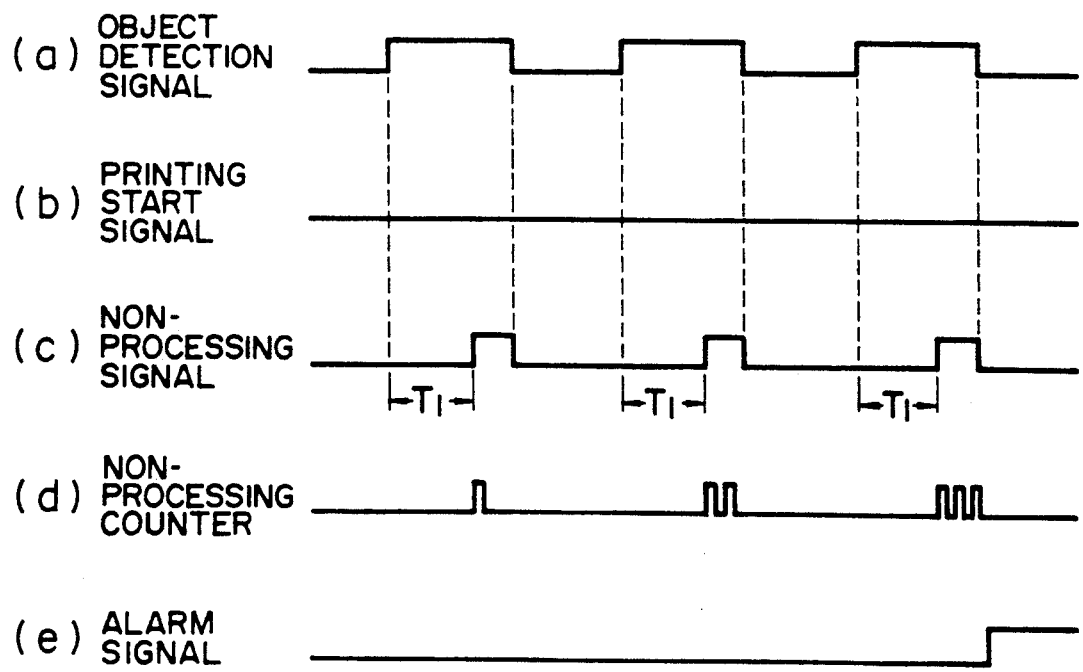

In a second embodiment, it is monitored whether or not printing is performed on each of the objects, and an alarm signal is generated when printing has failed on all of a predetermined number of, for example, three, successively conveyed objects. Referring to FIGS. 5, 6, and 7, the operation in the second embodiment will be described.

In the second embodiment, the steps 201 to 208 and 212 in FIG. 2 are executed in the same manner as in the first embodiment. When the delay time T2 of the monitoring timer has passed in the step 212, the operation goes to a step 502 in which a non-processing signal is generated so that the count "N" of a non-processing counter 22A provided in the printing monitoring timer is incremented by 1 (one) to "N+1" as shown in FIGS. 6(c) and 6(d), or in FIGS. 7(c) and 7(d). Next, the operation goes to a step 503 in which the count N of the non-processing counter 22A is compared with a predetermined number Nm. When N is not smaller than Nm, that is, N ≧ Nm, the operation goes to the step 213 in FIG. 2 so that an alarm signal is generated. If N is smaller than Nm, that is, N < Nm, on the contrary, the operation goes to the step 210 in FIG. 2. That is, even if the non-processing signal is generated, the alarm signal is not generated before the number of times N of the generation of the non-processing signal has reached Nm, for example Nm =3, but the printing start timer is reset so that a monitoring cycle is repeated for the succeeding object.

On the other hand, if a printing start signal is generated in the step 208, the operation goes to a step 501 as shown in FIG. 5, in which the count N of the non-processing counter 22A is reset to zero. Accordingly, when the non-processing signals are generated successively two times, the count N of the non-processing counter becomes "2", but if the printing start signal is generated at the third time, the count N is reset to "0" as shown in FIGS. 6(b) and 6(e). On the other hand, when the printing start signal is not generated successively three times, the count N of the non processing counter reaches "3" so that the alarm signal is generated, as shown in FIGS. 7(b) and 7(e).

Although description has been made in the foregoing embodiments as to the case where the present invention is applied to the apparatus for printing predetermined items on succeedingly conveyed objects by use of an ink-jet printer, the present invention is not limited to such embodiments but it is a matter of course that the invention is applicable to any other treating apparatus such as a printing apparatus of any other type, a laser machining apparatus, etc.

I claim:

1. An apparatus for monitoring, in a system including transporting means for successively transporting objects past a working station along a predetermined path and processing means operating independently of said transporting means for effecting, at said working station, a predetermined treatment on each of said objects transported by said transporting means, whether said predetermined treatment has been effected by said processing means at said working station on each of said objects transported by said transporting means, said apparatus comprising:

means for generating a first signal when each of said objects passes a predetermined position of said working station;

microcomputer means for performing a predetermined process relating to said predetermined treatment to be effected on each of said objects after a lapse of a first predetermined time interval from generation of said first signal, and for generating a second signal for instructing said processing means to start execution of said predetermined treatment at said working station when said microcomputer means has completed said predetermined process; and means for generating a third signal indicating failure of normal execution of said predetermined treatment when said second signal is not generated before a lapse of a second predetermined time interval from generation of said first signal, said second predetermined time interval being longer than said first predetermined time interval.

2. An apparatus according to claim 1, wherein said second signal is generated by a timer function provided in said microcomputer means and said means for generating said third signal is constituted by a timer provided separately from said microcomputer means.

3. An apparatus according to claim 1, wherein said second predetermined time interval is shorter than a time interval during which said first signal continues.

4. An apparatus according to claim 1, wherein said second predetermined time interval is automatically changed in accordance with change of a predetermined parameter.

5. An apparatus according to claim 1, wherein said second predetermined time interval is fixed.

6. An apparatus according to claim 1, further comprising means for generating a visible alarm signal in response to said third signal.

7. An apparatus for monitoring, in a system including transporting means for successively transporting objects past a printing station along a predetermined path and printing means provided at said printing station and operating independently of said transporting means for effecting, at said printing station, a predetermined printing process on each of said objects transported by said transporting means, whether said predetermined printing process has been effected by said printing means at said printing station on each of said objects transported by said transported means, said apparatus comprising:
means for generating a first signal when each of said objects passes a predetermined position of said printing station;
microcomputer means for performing a predetermined data process relating to said predetermined printing process to be effected on each of said objects after a lapse of a first predetermined time interval from generation of said first signal, and for generating a second signal for instructing said printing means to start execution of said predetermined printing process at said printing stations when said microcomputer means has completed said predetermined data process; and
means for generating a third signal indicating failure of normal execution of said predetermined printing process when said second signal is not generated before a lapse of a second predetermined time interval from generation of said first signal, said second predetermined time interval being longer than said first predetermined time interval.

8. An apparatus according to claim 7, wherein said second signal is generated by a timer function provided in said microcomputer means and said means for generating said third signal is constituted by a timer provided separately from said microcomputer means.

9. An apparatus according to claim 7, wherein said second predetermined time interval is shorter than a time interval during which said first signal continued.

10. An apparatus according to claim 7, wherein said second predetermined time interval is automatically changed in accordance with change of a predetermined parameter.

11. An apparatus according to claim 7, wherein said second predetermined time interval is fixed.

12. An apparatus according to claim 7, further comprising means for generating a visible alarm signal in response to said third signal.

13. An apparatus for monitoring, in a system including transporting means for successively transporting objects past a working station along a predetermined path and processing means operating independently of said transporting means for effecting, at said working station, a predetermined treatment on each of said objects transported by said transporting means, whether said predetermined treatment has been effected by said processing means at said working station on each of said objects transported by said transporting means, said apparatus comprising:
means for generating a first signal when each of said objects passes a predetermined position of said working station;
microcomputer means for performing a predetermined process relating to said predetermined treatment to be effected on each of said objects after a lapse of a first predetermined time interval from generation of said first signal, and for generating a second signal for instructing said processing means to start execution of said predetermined treatment at said working station when said microcomputer means has completed said predetermined process;
means for generating a third signal when said second signal is not generated before a lapse of a second predetermined time interval from generation of said first signal, said second predetermined time interval being longer than said first predetermined time interval; and
means for generating a fourth signal indicating failure of normal execution of said predetermined treatment when said third signal is successively generated for a predetermined number of said objects transported by said transporting means.

14. An apparatus according to claim 13, wherein said second signal is generated by a timer function provided in said microcomputer means and said means for generating said third signal is constituted by a timer provided separately from said microcomputer means.

15. An apparatus according to claim 13, wherein said second predetermined time interval is shorter than a time interval during which said first signal continues.

16. An apparatus according to claim 13, wherein said second predetermined time interval is automatically changed in accordance with change of a predetermined parameter.

17. An apparatus according to claim 13, wherein said second predetermined time interval is fixed.

18. An apparatus according to claim 13, further comprising means for generating a visible alarm signal in response to said fourth signal.

19. An apparatus for monitoring, in a system including transporting means for successively transporting objects past a printing station along a predetermined path and printing means provided at said printing station and operating independently of said transporting means for effecting, at said printing station, a predetermined printing process on each of said objects transported by said transporting means, whether said predetermined printing process has been effected by said printing means at said printing station on each of said objects transported by said transporting means, said apparatus comprising:

means for generating a first signal when each of said objects passes a predetermined position of said printing station;

microcomputer means for performing a predetermined data process relating to said predetermined printing process to be effected on each of said objects after a lapse of a first predetermined time interval from generation of said first signal, and for generating a second signal for instructing said printing means to start execution of said predetermined printing process at said printing station when said microcomputer means has completed said predetermined data process;

means for generating a third signal when said second signal is not generated before a lapse of a second predetermined time interval from generation of said first signal, said second predetermined time interval being longer than said first predetermined time interval; and means for generating a fourth signal indicating failure of normal execution of said predetermined printing process when said third signal is successively generated for a predetermined number of said objects transported by said transporting means.

20. An apparatus according to claim 19, wherein said second signal is generated by a timer function provided in said microcomputer means and said means for generating said third signal is constituted by a timer provided separately from said microcomputer means.

21. An apparatus according to claim 19, wherein said second predetermined time interval is set to be shorter than a time interval during which said first signal continues.

22. An apparatus according to claim 19, wherein said second predetermined time interval is automatically changed in accordance with change of a predetermined parameter.

23. An apparatus according to claim 19, wherein said second predetermined time interval is fixed.

24. An apparatus according to claim 19, further comprising means for generating a visible alarm signal in response to said fourth signal.

* * * * *